(12) United States Patent
He

(10) Patent No.: US 11,126,981 B2
(45) Date of Patent: Sep. 21, 2021

(54) RESOURCE TRANSFERRING METHOD AND APPARATUS

(71) Applicant: TENCENT TECHNOLOGY (SHENZHEN) COMPANY LIMITED, Shenzhen (CN)

(72) Inventor: Ruiming He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 84 days.

(21) Appl. No.: 16/204,500

(22) Filed: Nov. 29, 2018

(65) Prior Publication Data

US 2019/0095887 A1 Mar. 28, 2019

Related U.S. Application Data

(63) Continuation of application No. PCT/CN2017/094526, filed on Jul. 26, 2017.

(30) Foreign Application Priority Data

Jul. 28, 2016 (CN) .......................... 201610613100.0

(51) Int. Cl.
*G06Q 20/10* (2012.01)
*G06Q 40/02* (2012.01)
(Continued)

(52) U.S. Cl.
CPC .......... *G06Q 20/108* (2013.01); *G06Q 20/10* (2013.01); *G06Q 20/227* (2013.01); *G06Q 20/40* (2013.01);
(Continued)

(58) Field of Classification Search
USPC ...................................................... 705/35–45
See application file for complete search history.

(56) References Cited

U.S. PATENT DOCUMENTS 7,103,784 B1 * 9/2006 Brown ................ G06F 21/6218
713/151
8,065,190 B2 * 11/2011 Collas .................... G06Q 20/12
705/26.1
(Continued)

FOREIGN PATENT DOCUMENTS

CN 103679449 A 3/2014
CN 104217332 A 12/2014
(Continued)

OTHER PUBLICATIONS

Messmore, Scott, "Space Coast CU Offering 'Family Banking' Account-Control Option", Credit Union Journal, New York, vol. 9, issue 37, Sep. 19, 2005, pp. 1-3. (Year: 2005).*
(Continued)

*Primary Examiner* — Mohammad Z Shaikh
(74) *Attorney, Agent, or Firm* — Anova Law Group, PLLC

(57) ABSTRACT

A resource transferring method and apparatus are provided. The method includes receiving a resource transferring request corresponding to a shared specified account sent by any client in multiple clients. The specified account is registered at the server as being associated with the multiple clients, and stores a preset resource. The method also includes determining rights of the multiple clients. The rights include an operation right and an ordinary right, and the operation right is capable of controlling a transfer of the preset resource. The method also includes respectively sending operation information to the multiple clients according to the rights of the multiple clients; and respectively receiving control instructions from at least two clients having the operation right. When a number of the received control instructions are greater than a preset value, the server
(Continued)

transfers the preset resource, and returns transferring information of the preset resource to the multiple clients.

19 Claims, 12 Drawing Sheets

(51) Int. Cl.
  *G06Q 20/40* (2012.01)
  *H04L 29/06* (2006.01)
  *G06Q 20/22* (2012.01)
  *G06Q 50/00* (2012.01)

(52) U.S. Cl.
  CPC ......... *G06Q 20/401* (2013.01); *G06Q 20/405* (2013.01); *G06Q 20/4037* (2013.01); *G06Q 40/02* (2013.01); *H04L 63/102* (2013.01); *G06Q 50/01* (2013.01)

(56) References Cited

U.S. PATENT DOCUMENTS

| | | | | |
|---|---|---|---|---|
| 8,301,502 | B2* | 10/2012 | Livnat | G06Q 20/405 705/21 |
| 8,346,668 | B2* | 1/2013 | Fujita | G06Q 20/3829 705/67 |
| 8,401,698 | B2* | 3/2013 | Kamrani | G05B 19/4188 700/245 |
| 8,401,968 | B1* | 3/2013 | Schattauer | G06Q 20/40 705/44 |
| 9,934,505 | B2* | 4/2018 | Atagun | G06Q 20/22 |
| 10,108,950 | B2* | 10/2018 | Wetzel | G06Q 20/32 |
| 10,146,955 | B2* | 12/2018 | Fuchs | G06F 21/6236 |
| 10,410,188 | B2* | 9/2019 | James | G06Q 20/29 |
| 2001/0037257 | A1* | 11/2001 | Niki | G06Q 30/0222 705/14.1 |
| 2002/0038236 | A1* | 3/2002 | Schechter | G06Q 40/04 705/12 |
| 2002/0198806 | A1* | 12/2002 | Blagg | G06Q 40/02 705/35 |
| 2004/0111375 | A1* | 6/2004 | Johnson | G06Q 20/38215 705/64 |
| 2004/0139327 | A1* | 7/2004 | Brown | H04L 9/3297 713/176 |
| 2005/0027626 | A1* | 2/2005 | Garcia | G06Q 40/02 705/35 |
| 2006/0155617 | A1* | 7/2006 | Dasilva | G06Q 40/12 705/30 |
| 2008/0052203 | A1* | 2/2008 | Beyer | G06Q 10/087 705/28 |
| 2008/0119162 | A1* | 5/2008 | Sivalingam | H04M 15/78 455/408 |
| 2008/0228637 | A1* | 9/2008 | Scipioni | G06Q 20/04 705/39 |
| 2009/0099965 | A1* | 4/2009 | Grant, IV | G06Q 20/105 705/41 |
| 2009/0144183 | A1* | 6/2009 | Gatchell | G06Q 10/06 705/34 |
| 2010/0153224 | A1* | 6/2010 | Livnat | G06Q 20/202 705/21 |
| 2011/0282678 | A1* | 11/2011 | Chapman | G06Q 30/06 705/1.1 |
| 2012/0047560 | A1* | 2/2012 | Underwood | G06F 21/30 726/4 |
| 2012/0143761 | A1* | 6/2012 | Doran | G06Q 20/08 705/44 |
| 2013/0144663 | A1* | 6/2013 | Qawami | G06Q 20/40 705/5 |
| 2013/0173467 | A1* | 7/2013 | Nuzzi | G06Q 20/3224 705/44 |
| 2013/0173470 | A1* | 7/2013 | Nuzzi | G06Q 20/3224 705/44 |
| 2014/0108235 | A1* | 4/2014 | Chelst | G06Q 20/227 705/39 |
| 2014/0156508 | A1* | 6/2014 | Argue | G06Q 20/32 705/39 |
| 2014/0279526 | A1* | 9/2014 | Jackson | G06Q 20/381 705/44 |
| 2015/0135286 | A1* | 5/2015 | Egan | H04L 63/20 726/5 |
| 2015/0142661 | A1* | 5/2015 | Jain | G06Q 20/10 705/44 |
| 2015/0302384 | A1* | 10/2015 | Aadi | G06Q 20/14 705/40 |
| 2016/0019472 | A1* | 1/2016 | Javit | G06Q 10/02 705/5 |
| 2016/0117650 | A1* | 4/2016 | Weidenmiller | G06Q 20/26 705/44 |
| 2016/0342992 | A1* | 11/2016 | Lee | G06Q 30/06 |
| 2016/0350848 | A1* | 12/2016 | Acharya | G06Q 40/02 |
| 2017/0069030 | A1* | 3/2017 | Alleyne | G06Q 40/08 |
| 2017/0169507 | A1* | 6/2017 | Skaarup | G06Q 40/02 |

FOREIGN PATENT DOCUMENTS

| | | |
|---|---|---|
| CN | 105099879 A | 11/2015 |
| CN | 105530175 A | 4/2016 |
| CN | 106230812 A | 12/2016 |
| WO | 2008009052 A1 | 1/2008 |

OTHER PUBLICATIONS

The World Intellectual Property Organization (WIPO) International Search Report for PCT/CN2017/094526 Sep. 30, 2017 5 Pages (including translation).
The State Intellectual Property Office of the People's Republic of China (SIPO) office Action 1 for 201610613100.0 Oct. 23, 2018 9 Pages (including translation).

* cited by examiner

RESOURCE TRANSFERRING METHOD AND APPARATUS

RELATED APPLICATION

The application is a continuation application of PCT Patent Application No. PCT/CN2017/094526, filed on Jul. 26, 2017, which claims priority to Chinese Patent Application No. 2016106131000, filed with the Chinese Patent Office on Jul. 28, 2016 and entitled "RESOURCE TRANSFERRING METHOD AND APPARATUS", the entire contents of both of which are incorporated herein by reference.

FIELD OF THE TECHNOLOGY

The present disclosure relates to the field of Internet technologies, and in particular, to a resource transferring method and apparatus.

BACKGROUND OF THE DISCLOSURE

With the development of Internet technologies, it becomes increasingly common to transfer resources by using online platforms. Resource transferring is to transfer a resource in an account to another account by using a server and based on a network. For example, a typical resource transferring scenario may be a payment scenario.

Using a payment scenario as an example, assuming that members at a group activity need to pay by going Dutch, a member may pay to a merchant, and then other members pay parts of the other members to the member in a form of cash or money transferring.

In a process of implementing the present disclosure, it is found that the existing technology at least has the following problems.

The foregoing resource transferring process relates to complex resource transferring operations of multiple sides such as a transferor and a transferee. This takes a long time and actual efficiency of resource transferring is low.

SUMMARY

To resolve the problem in the existing technology, embodiments of the present disclosure provide a resource transferring method and apparatus. The technical solutions are as follows:

According to one aspect, a resource transferring method is provided. The method is applied to a server and includes receiving a resource transferring request corresponding to a shared specified account sent by any client in multiple clients. The specified account is registered at the server as being associated with the multiple clients, and the specified account stores a preset resource. The method also includes determining rights of the multiple clients at the specified account. The rights include an operation right and an ordinary right, and the operation right is capable of controlling a transfer of the preset resource. The method also includes respectively sending operation information to the multiple clients according to the rights of the multiple clients; and respectively receiving control instructions sent by at least two clients having the operation right. When a number of the received control instructions are greater than a preset value, the server transfers the preset resource, and returns transferring information of the preset resource to the multiple clients.

According to another aspect, a resource transferring method is provided. The method is applied to a user terminal and includes receiving operation information of a resource transferring request corresponding to a shared specified account from a server. The specified account is associated with multiple account members, and the user terminal is a client of one of the multiple account members. The method also includes displaying a resource transferring confirmation interface of a specified account. The resource transferring confirmation interface prompts for input of sub-verification information of current resource transferring. The method also includes obtaining verification feedback information input on the resource transferring confirmation interface; and sending the verification feedback information to the server. The server transfers a resource out of the specified account according to the verification feedback information sent by specified members of the multiple account members.

According to yet another aspect, a terminal is provided. The terminal includes one or more processors, and a memory. The one or more processors are configured to perform: receiving operation information of a resource transferring request corresponding to a shared specified account from a server. The specified account is associated with multiple account members, and the user terminal is a client of one of the multiple account members. The one or more processors are also configured to perform: displaying a resource transferring confirmation interface of a specified account. The resource transferring confirmation interface prompts for input of sub-verification information of current resource transferring. The one or more processors are also configured to perform: obtaining verification feedback information input on the resource transferring confirmation interface; and sending the verification feedback information to the server. The server transfers a resource out of the specified account according to the verification feedback information sent by specified members of the multiple account members.

The technical solutions provided in the embodiments of the present disclosure have the following beneficial effects:

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
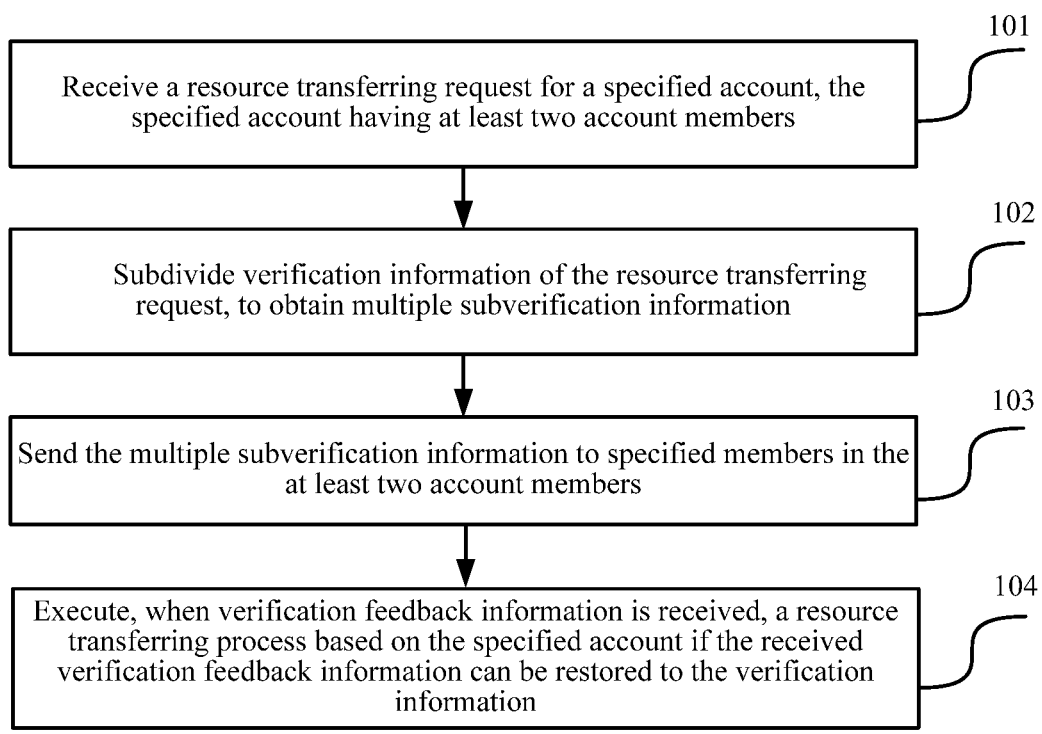
FIG. 1 is a flowchart of a resource transferring method according to an embodiment of the present disclosure.

FIG. 1 is a flowchart of a resource transferring method according to an embodiment of the present disclosure. The method is performed by a server. Referring to FIG. 1, the method includes the following steps.

101: Receive a resource transferring request, the resource transferring request being used for transferring a resource to a specified account, and the specified account having at least two account members.

The specified account is an account that may transfer a resource and that may be shared by multiple persons. The specified account has at least two account members, and at least two specified members are set in these account members. The account members have rights for transferring the resource to the specified account and viewing the specified account. The specified members further have a right for initiating the resource transferring request by using the specified account. Member rights of the specified account may be changed by members creating the account or the specified members after the specified account is created. For example, the rights of an account member are changed to that of the specified members, so as to provide a manner for flexibly setting rights of a member. At least two account members in the specified account may refer to that a binding relationship exists between the specified account and the account member. For example, in a social application, the specified account may be bound to multiple social accounts. The specified account may be an account associated with a group (for example, an account bound to a group), or may be an account associated with multiple account members. For the foregoing association relationship, the specified account may be displayed in a group option list of the group. Alternatively, the specified account may be displayed on a virtual account page of each of the account members and may be displayed together with a virtual account of the account member. For example, for a social application, the foregoing group may be a group or a temporary group in the social application.

Further, when the resource transferring request initiated by any account member by using the specified account as a target account is received, a resource value corresponding to the resource transferring request is deducted from an account of the account member, and the resource value is added to the specified account. The process enables each account member to spontaneously transfer a resource to the specified account, thereby achieving flexible resource sources. The account of the account member may refer to an account bound to the account member, for example, an account (e.g., a payment account, a virtual wallet account) bound to an account of a social application of the account member.

Further, when the specified account is displayed on a terminal of any account member, if a request of the account member for viewing the specified account is received, specific information, for example, information such as transaction details and an account balance, of the specified account is displayed on the terminal in response to the viewing request. The process enables each account member to learn of a specific condition of the specified account, thereby ensuring a dynamic right to know of the account member for the specified account. This makes transparency of the specified account high for any account member, thereby ensuring security of the account. The specific information of the specified account may be obtained through interaction between the terminal and the server. After obtaining the specific information of the specified account, the terminal displays the specific information on an interface based on a preset format.

Further, when the specified account is displayed on a terminal of any account member, if the resource transferring request of the account member for the specified account is received, the server needs to determine whether the account member initiating the resource transferring request is a specified member. If the account member initiating the resource transferring request is a specified member, the server performs step 102 and the subsequent steps in response to the resource transferring request. The process enables actual transferring of the specified account to be determined by only the specified member. This avoids random misappropriation of any account member and improves security of the account.

To ensure that the specified account has enough resources to perform current resource transferring, resources may be collected. That is, before step 101, the method may further include: initiating, by any specified member, a resource collection instruction to the server by using the specified account, and sending, by the server after receiving the resource collection instruction, a resource collection request to all account members of the specified account. In this way, each account member may transfer a resource to the specified account by using an account of the account member.

In addition, when there is no resource transferring requirement, resources may also be collected. That is, the method may further include that: When resources need to be collected to the specified account, any specified member may initiate the resource collection instruction to the server by using the specified account, and after receiving the resource collection instruction, the server sends the resource collection request to all account members of the specified account.

For the foregoing two cases, the resource collection request may carry a same resource value, so that each account member in the specified account pay a same resource value, thereby ensuring fairness. Certainly, the serve may alternatively obtain a resource value corresponding to each account member according to a preset collection percentage of each account member and a total value of the resource specified by the resource collection instruction, and add the corresponding resource value to the resource collection request of each account member. The preset collection percentage may be set by the specified member.

When a resource needs to be transferred from the specified account, any specified member may initiate the resource transferring request to the server by using the specified account. When receiving the resource transferring request for the specified account, the server performs the subsequent steps.

It should be noted that, the specified account may be created by any user, and the establishing user sets the account member, specified member, and the like of the specified account. In addition, the foregoing resource collection may be performed by using a resource collection option of the specified account. The resource collection option may be visible only to the specified member in the specified account, so as to avoid random initiation of any account member.

102: Subdivide verification information of the resource transferring request, to obtain multiple sub-verification information.

After receiving the resource transferring request, the server generates the verification information for the resource transferring request and subdivides the verification information into multiple sub-verification information. For different resource transferring requests, different verification information may be generated, to ensure time validity of the verification information. Certainly, the number of the sub-verification information subdivided in some embodiments of the present disclosure may be adjusted by the server according to a requirement, and a flexible setting manner is provided.

A process of subdividing the verification information may be performed by using a corresponding algorithm of a secret sharing solution. For example, when the specified account has n specified members, it is determined that the verification information is subdivided into n pieces of sub-verification information. In addition, a value t is preset, so that the verification information of the resource transferring request at this time may be restored by using t pieces of sub-verification information through the foregoing subdivision.

The following provides description by using a Shamir secret sharing solution as an example. A specific algorithm of the solution is as follows:

First, n different non-zero elements $x_i$ are selected and distributed to each specified member, and $x_i$ is disclosed. Subsequently, t−1 elements $a_1, a_2, \ldots,$ and $a_{t-1}$ are dependently and randomly selected to form, with verification information K, a polynomial of a degree t−1: $f(x)=K+a_1x+a_2x^2+ \ldots +a_{t-1}x_{t-1}$. $y_i=f(x_i)$ is then calculated. n yi may be obtained by using n $x_i$, and n yi are distributed to each specified member to serve as sub-verification information of the specified member. finally, when any t specified members in the n specified members feed back the sub-verification information yi of the specified members, t points of $(x_1, y_1)$, $(x_2, y_2), \ldots,$ and $(x_t, y_t)$ may be obtained. The polynomial f(x) may be restored by means of interpolation by using the n points, so as to restore the verification information $K=f(x_0)$. Apparently, if more than t specified members provide the sub-verification information yi of the t specified members, more points may be obtained. The verification information may be restored by using any t points.

Even if for different resource transferring requests, same verification information may be generated. Different sub-verification information may be obtained through subdivision by using the foregoing algorithm. A reason lies in that: $a_1, a_2, \ldots,$ and $a_{t-1}$ are t−1 elements that are randomly selected, so that the t−1 elements selected may be different every time, and the polynomial f(x) formed by the t−1 elements is also different. In this way, the sub-verification information yi obtained through calculation is also different.

Certainly, the verification information of the foregoing resource transferring request may alternatively be preset verification information, for example, a payment password of an account. During resource transferring, multiple specified members may enter information together to restore the verification information, so as to securely verify and avoid cases such as resource theft.

103: Send the multiple sub-verification information to specified members in the at least two account members.

In this step, the server is configured to restore the sub-verification information of the verification information and send the sub-verification information to each of the specified members of the specified account.

For a terminal of any specified member, when receiving the sub-verification information, the terminal may display the sub-verification information in a form of verification pictures, simultaneously display an input box, thereby enabling the specified member to input the sub-verification information by using the input box, and send the input sub-verification information in a form of verification feedback information to the server.

Certainly, when displaying the sub-verification information, the terminal may further display a resource value of a resource transferring request performed on the specified account, prompt information used for querying whether to perform transferring, and the like. This is not specifically limited by this embodiment of the present disclosure.

Further, when sending the sub-verification information, the server may also send resource transferring prompt information to an account member who is not a specified member, so that the account member can learn of the resource transferring that needs to be perform at present, thereby ensuring notification comprehensiveness.

104: Execute, when verification feedback information is received, a resource transferring process based on the specified account if the received verification feedback information can be restored to the verification information.

After receiving the sub-verification information, any specified member may feed back the received sub-verification information to the server in a manner specifically described in the foregoing step 103. When receiving the verification feedback information of the specified member, and determining that the number of the received verification feedback information is greater than a preset value, the server may determine that the received verification feedback information can be restored to the verification information of the resource transferring request at this time, and then execute the resource transferring process. A resource value of the resource transferring request is transferred to a target account. The target account is an object of the current resource transferring and may be a merchant or the like. In this way, the resource transferring for the specified account is completed.

Figure 2:
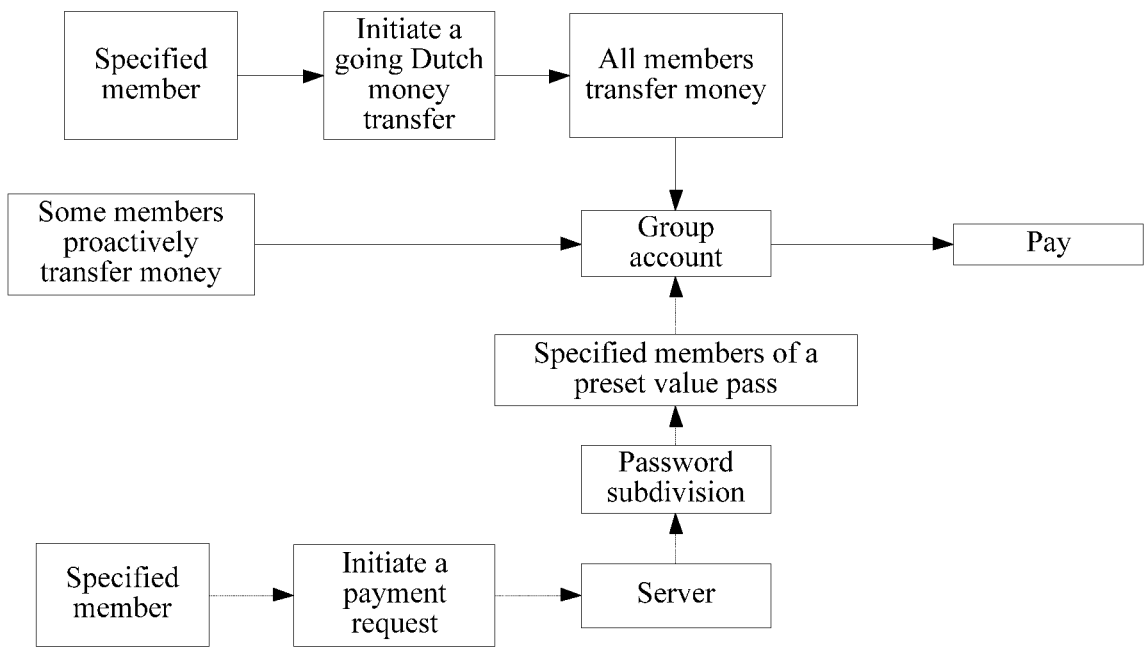
FIG. 2 is a flowchart of a resource transferring method according to an embodiment of the present disclosure.

To represent a resource transferring process of the present disclosure more clearly, description is made with an example where the specified account is a group account. For example, as shown in FIG. 2, a group may set a group account and set a specified member having decision-making power. The specified member may initiate a going Dutch money transfer (averagely paying by members), so that all members of the group account transfer money to the group account, and each member transfers a same amount of money. Certainly, a member of the group account may alternatively spontaneously transfer money to the group account. For the group account, only the specified member may initiate a payment request based on the group account. For example, a merchant is paid by using a balance in the group account. After receiving the payment request, a server generates a payment password, subdivides the payment password to obtain multiple sub-passwords, and respectively sends the multiple sub-passwords to the specified members of the group account. When a preset number of the specified members feed back the sub-passwords, payment is executed at this time. A payment process is not further described.

In the method provided by some embodiments of the present disclosure, specified members having decision-making power are set in the specified account. These specified members initiate a resource transferring request by using the specified account. The server subdivides verification information of the resource transferring request into different sub-verification information to distribute to each of the specified members. Current resource transferring is completed according to feedback of the specified members. While security of the specified account is ensured, flexibility of resource transferring may be improved and actual efficiency is high. Further, such a resource transferring process based on the specified account provides a better money payment experience for a group activity. In addition, because different rights are provided for members of different identities, flexibility of use of the specified account is greatly improved.

Figure 3A:
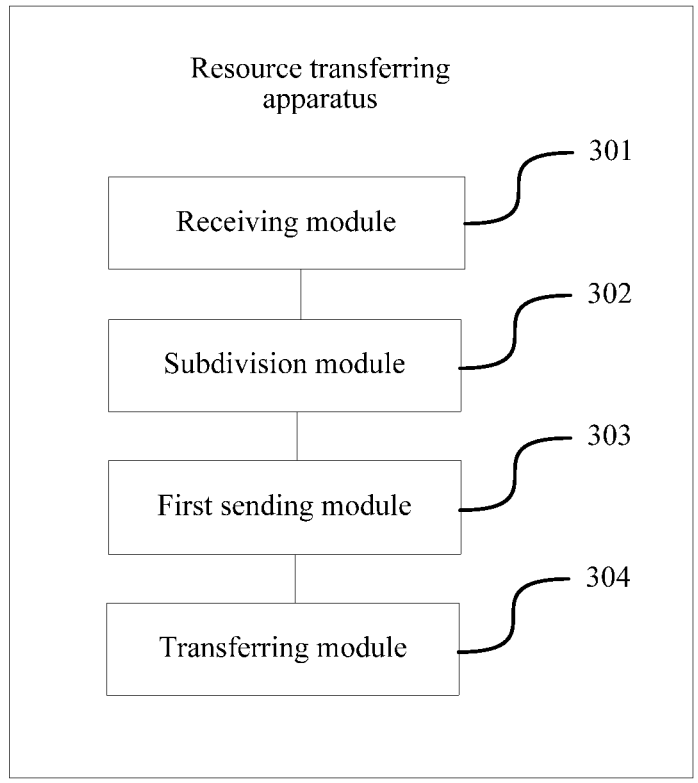
FIG. 3A is a schematic structural diagram of a resource transferring apparatus according to an embodiment of the present disclosure.

FIG. 3A is a schematic structural diagram of a resource transferring apparatus according to an embodiment of the present disclosure. Referring to FIG. 3A, the apparatus includes:

a receiving module 301, configured to receive a resource transferring request for a specified account, the specified account having at least two account members;

a subdivision module 302, configured to subdivide verification information of the resource transferring request, to obtain multiple sub-verification information;

a first sending module 303, configured to send the multiple sub-verification information to specified members in the at least two account members; and a transferring module 304, configured to execute, when verification feedback information is received, a resource transferring process based on the specified account if the received verification feedback information can be restored to the verification information.

Figure 3B:
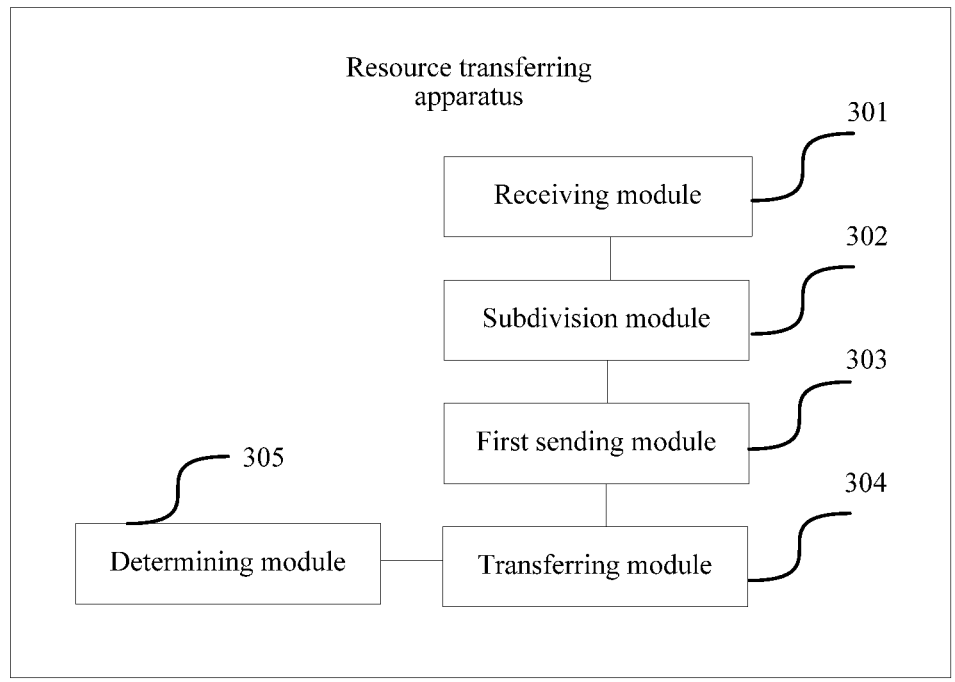
FIG. 3B is a schematic structural diagram of a resource transferring apparatus according to an embodiment of the present disclosure.

Optionally, referring to FIG. 3B, the apparatus further includes:

a determining module 305, configured to determine that the received verification feedback information can be restored to the verification information when the verification feedback information is received and when it is determined that the number of the specified members sending the verification feedback information is greater than a preset value.

Figure 3C:
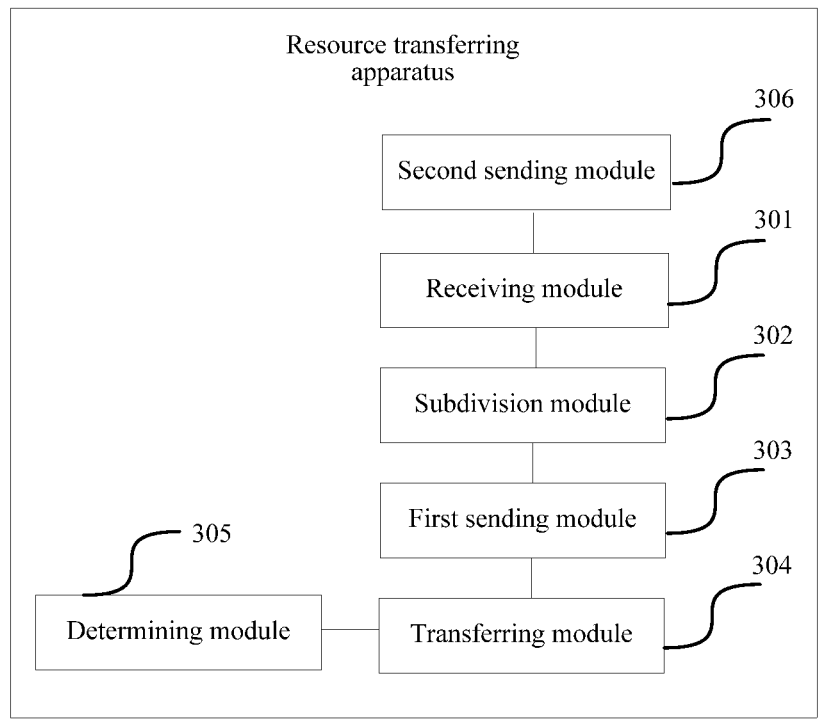
FIG. 3C is a schematic structural diagram of a resource transferring apparatus according to an embodiment of the present disclosure.

Optionally, referring to FIG. 3C, the apparatus further includes:

a second sending module 306, configured to send a resource collection request to the at least two account members when a resource collection instruction for the specified account of any one of the specified members is received, to enable the at least two account members to transfer a resource to the specified account.

Figure 3D:
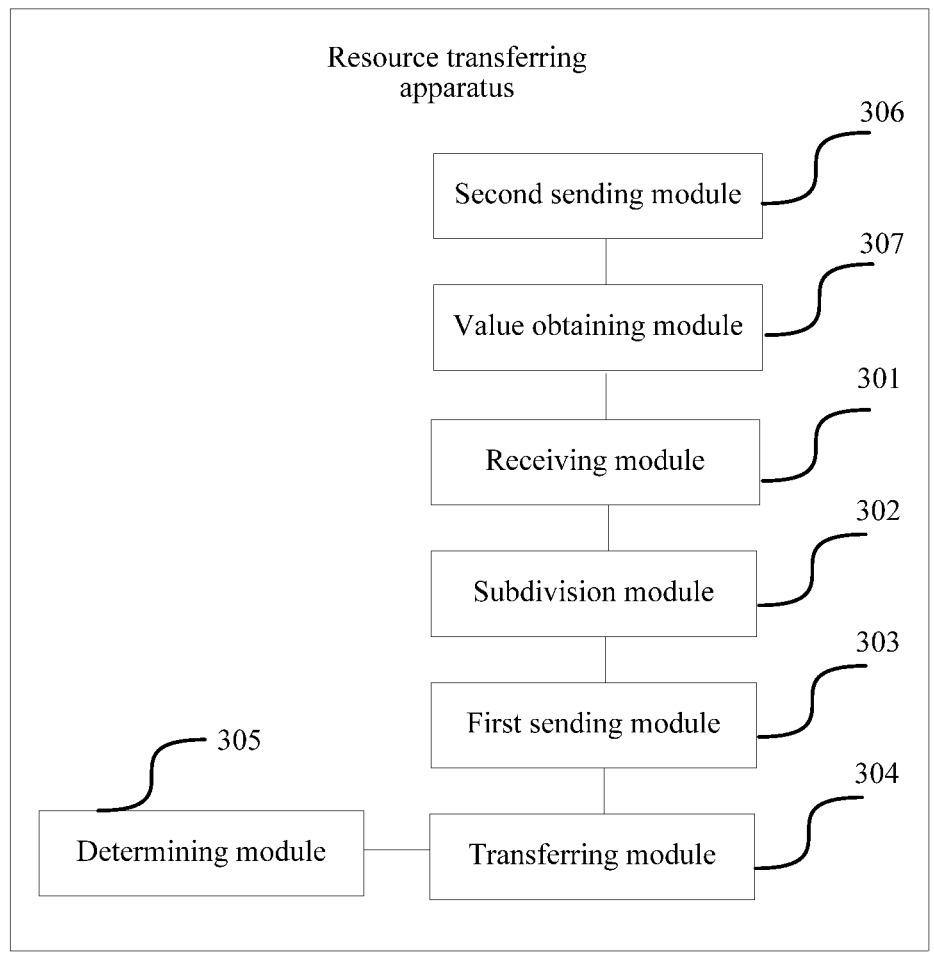
FIG. 3D is a schematic structural diagram of a resource transferring apparatus according to an embodiment of the present disclosure.

Optionally, referring to FIG. 3D, the apparatus further includes:

a value obtaining module 307, configured to obtain a resource value corresponding to each account member according to a preset collection percentage of the at least two account members and a total value of the resource specified by the resource collection instruction, and add the corresponding resource value to the resource collection request of each account member.

Optionally, the at least two account members have a right for transferring a resource to the specified account. The specified member not only has a right for transferring the resource to the specified account, but also has a right for initiating the resource transferring request by using the specified account.

Optionally, the at least two account members have a right for viewing the specified account.

It should be noted that division of the foregoing functional modules is only described for exemplary purposes when the resource transferring apparatus provided in the foregoing embodiments transfers a resource. In an actual application, the foregoing functions may be allocated to be accomplished by different functional modules according to requirements, that is, the internal structure of the apparatus is divided into different functional modules, to accomplish all or some functions of the above described functions. In addition, the resource transferring apparatus provided in the foregoing embodiment belongs to the same concept as the resource transferring method embodiment. For a specific implementation process of the apparatus, refer to the method embodiment, and details are not described herein again.

Figure 4:
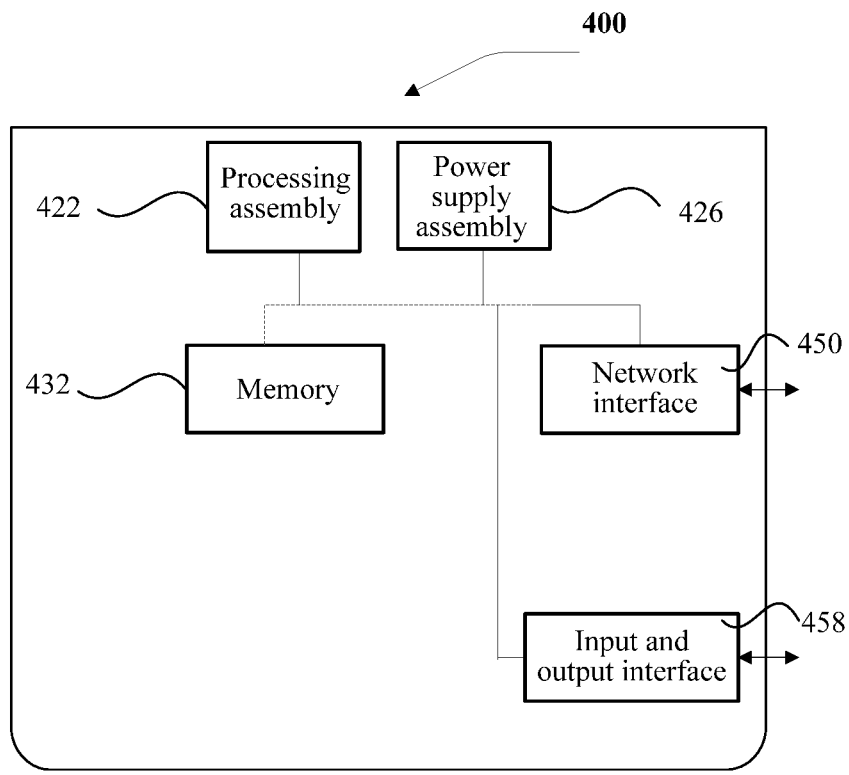
FIG. 4 is a block diagram of a resource transferring apparatus according to an embodiment of the present disclosure.

FIG. 4 is a block diagram of a resource transferring apparatus 400 according to an embodiment of the present disclosure. For example, the apparatus 400 may be provided as a server. Referring to FIG. 4, the apparatus 400 includes a processing assembly 422, and further includes one or more processors, a memory resource represented by a memory 432, and one or more programs. The one or more programs are stored in the memory, and the program may include one or more modules, one module being corresponding to one group of instructions. In addition, the one or more processors are configured to execute instructions to perform steps of the resource transferring method of a server side in some embodiments of the present disclosure.

The apparatus 400 may further include a power supply assembly 426, configured to perform power supply management of the apparatus 400, a wired or wireless network interface 450, configured to connect the apparatus 400 to a network, and an input/output (I/O) interface 458. The apparatus 400 may operate an operating system stored in the memory 432, for example, Windows Server™, Mac OS X™, Unix™, Linux™, or FreeBSD™.

An embodiment of the present disclosure further provides a computer-readable storage medium. The computer-readable storage medium stores a computer program, and the computer program implements the steps of the resource transferring method of the server side in some embodiments of the present disclosure when being executed by the processor.

Figure 5A:
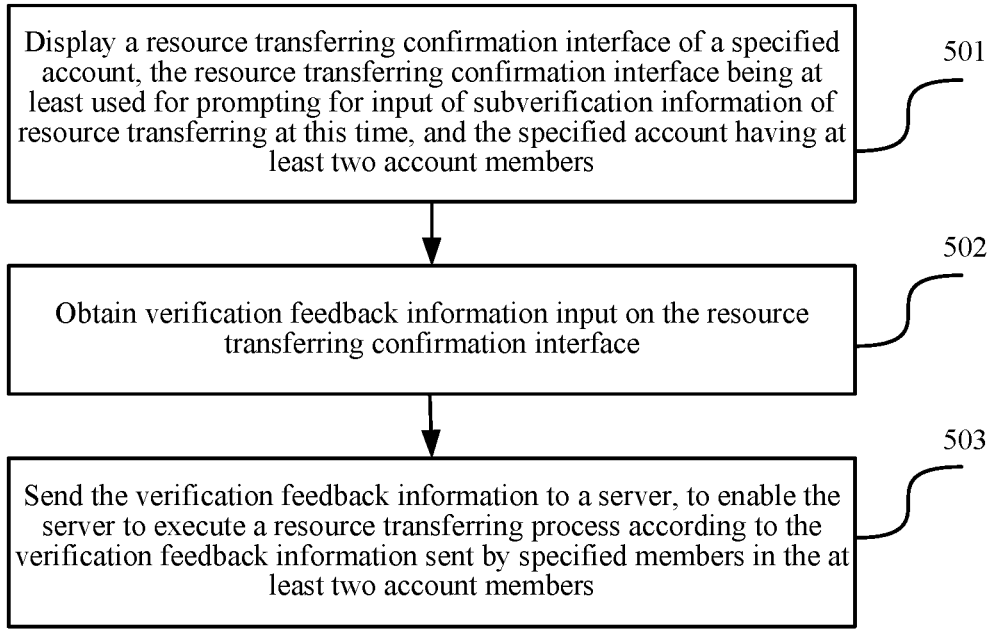
FIG. 5A is a flowchart of a resource transferring method according to an embodiment of the present disclosure.

FIG. 5A is a flowchart of a resource transferring method according to an embodiment of the present disclosure. This embodiment of the present disclosure additionally describes the resource transferring method from an aspect of a terminal, and the terminal may be a terminal of a specified member of a specified account. Referring to FIG. 5A, the method includes:

500: Display sub-verification information sent by a server, the sub-verification information being obtained by subdividing verification information of resource transferring for the specified account at this time by the server.

A current terminal user may be the specified member initiating the resource transferring, or may be any specified member of the specified account. This embodiment of the present disclosure only provides description with an example where the current terminal user is any specified member of the specified account.

As described in step 101, when a resource needs to be transferred from the specified account, the specified member may manually initiate a resource transferring instruction on the terminal. When receiving the resource transferring instruction, the terminal sends the resource transferring request for the specified account to the server. As described in step 102, after receiving the resource transferring request, the server generates the verification information for the resource transferring request, subdivides the verification information into the multiple sub-verification information, and sends the multiple sub-verification information to the specified member. The specified subdivision manner of the verification information is described in detail in step 102, which is not further described herein again.

When receiving the sub-verification information sent by the server (e.g., included in operation information of a resource transferring request corresponding to the shared specified account), the terminal displays the sub-verification information, and for example, displays the sub-verification information in a form of a short message service message, an application message, an verification picture, or verification code on a client. After displaying the sub-verification information, the terminal simultaneously displays a confirmation interface of the current resource transferring, to prompt the specified member to feed back the received sub-verification information.

Figure 5B:
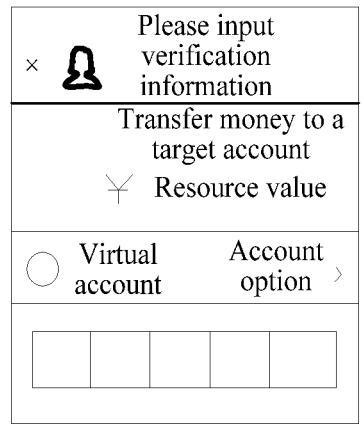
FIG. 5B is a schematic diagram of a resource transferring interface according to an embodiment of the present disclosure.
Figure 5C:
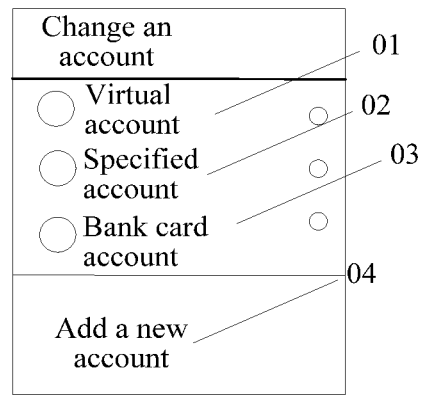
FIG. 5C is a schematic diagram of an account selection interface according to an embodiment of the present disclosure.
Figure 5D:
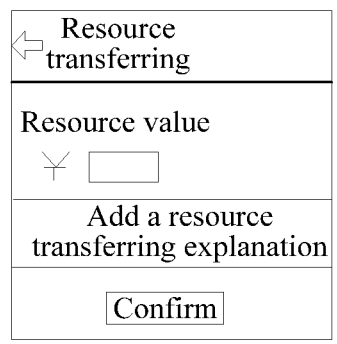
FIG. 5D is a schematic diagram of an interface of resource value confirmation according to an embodiment of the present disclosure.

In another embodiment of the present disclosure, a current terminal user may alternatively be a specified member initiating resource transferring. Correspondingly, the method further includes: A terminal initiates a resource transferring interface by scanning picture code. A target account, a to-be-transferred resource value, an account option, and a verification information option (as shown in FIG. 5B) may be displayed on the resource transferring interface. When a triggering operation on the account option is detected, an account selection interface may be displayed. The account selection interface may display a specified account 02, a bank card account 03 of the current terminal user, a virtual account 01, and an option 04 for adding a new account (as shown in FIG. 5C). When a selection operation on the specified account by the user is detected, a resource transferring request for the specified account is triggered. Certainly, in the foregoing process, another interface may further be displayed. For example, before displaying the account selection interface, the terminal may further display an interface used for confirming a resource value, as shown in FIG. 5D.

501: Display a resource transferring confirmation interface of the specified account, the resource transferring confirmation interface being at least used for prompting for input of the sub-verification information of current resource transferring, and the specified account having at least two account members. In some embodiments, the terminal may receive operation information of a resource transferring request corresponding to the shared specified account from the server. The specified account is associated with multiple account members, and the terminal is a client of one of the multiple account members.

As described in step 103, the resource transferring confirmation interface may be displayed in a form of an input box, to prompt the specified members to input the sub-verification information of the current resource transferring.

In addition, as described in step 101, to ensure that the specified account has enough resources to perform the current resource transferring, the specified member may alternatively manually initiate a resource collection instruction on a client of the specified account. When receiving the resource collection instruction, the terminal sends the resource collection instruction for the specified account to the server, so that the terminal notifies all the account members to transfer a resource to the specified account in a form of sending a resource collection request. When receiving the resource collection request sent by the server, the account members transfer a resource to the specified account.

Further, the account members have a right for viewing the specified account. That is, as described in step 101, any account member may manually initiate a specified account viewing request to the server on the terminal. The server sends specific information of the specified account to the terminal in response to the viewing request, and the terminal displays the specific information of the specified account, so as to ensure a dynamic right to know of the account member for the specified account.

It should be noted that, this embodiment of the present disclosure provides description with an example where the sub-verification information and the resource transferring confirmation interface are separately displayed. However, in fact, the sub-verification information may be alternatively displayed on the resource transferring confirmation interface, so that a user (e.g., the account member using the terminal) enters according to the sub-verification information displayed by the interface to improve inputting accuracy. Certainly, if the resource transferring function also has a capability of automatically reading received information, the resource transferring function may also automatically read the sub-verification information and directly write the sub-verification information that is read on the resource transferring confirmation interface.

502: Obtain verification feedback information input on the resource transferring confirmation interface.

As described in step 501, when the specified member feeds back the sub-verification information of current resource transferring in a form of the sub-verification information on the resource transferring confirmation interface, the terminal obtains the verification feedback information.

503: Send the verification feedback information to the server, to enable the server to transfer a resource out of the specified account according to the verification feedback information sent by the specified members in the at least two account members.

When obtaining the verification feedback information input by the specified members, the terminal sends the verification feedback information to the server. The server may determine whether the received verification feedback information can be restored to the verification information of current resource transferring by using a manner specifically described in step 104. If the server determines that the verification information can be restored, the resource transferring process is executed.

In the method provided by some embodiments of the present disclosure, specified members having decision-making power are set in the specified account. These specified members initiate a resource transferring request by using the specified account. The server subdivides verification information of the resource transferring request into different sub-verification information to distribute to each of the specified members. Current resource transferring is completed according to feedback of the specified members. While security of the specified account is ensured, flexibility of resource transferring may be improved and actual efficiency is high.

Figure 6A:
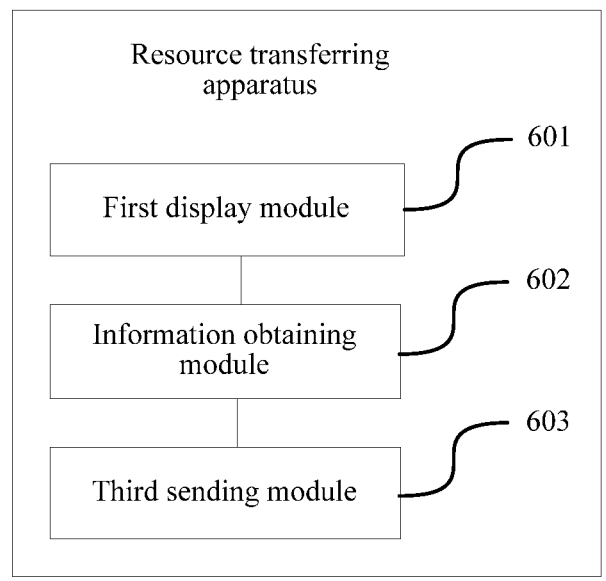
FIG. 6A is a schematic structural diagram of a resource transferring apparatus according to an embodiment of the present disclosure.

FIG. 6A is a schematic structural diagram of a resource transferring apparatus according to an embodiment of the present disclosure. Referring to FIG. 6A, the apparatus includes:

a first displaying module 601, configured to display a resource transferring confirmation interface of a specified account, the resource transferring confirmation interface being at least used for prompting for input of sub-verification information of current resource transferring, and the specified account having at least two account members;

an information obtaining module 602, configured to obtain verification feedback information input on the resource transferring confirmation interface; and a third sending module 603, configured to send the verification feedback information to a server, to enable the server to execute a resource transferring process according to the verification feedback information sent by specified members in the at least two account members.

Figure 6B:
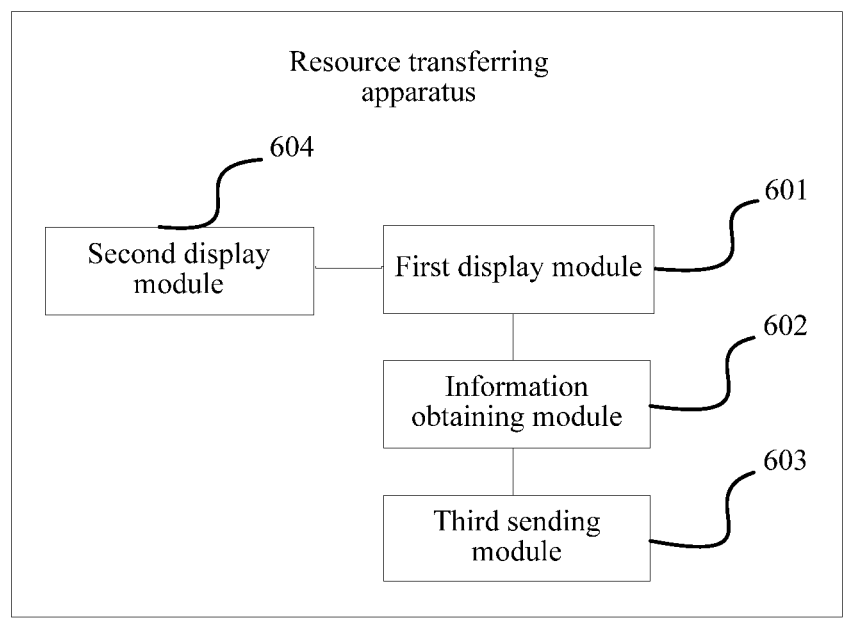
FIG. 6B is a schematic structural diagram of a resource transferring apparatus according to an embodiment of the present disclosure.

Optionally, referring to FIG. 6B, the apparatus further includes: a second display model 604, configured to display the sub-verification information sent by the server, the sub-verification information being obtained by the server by subdividing the verification information of current resource transferring.

Figure 6C:
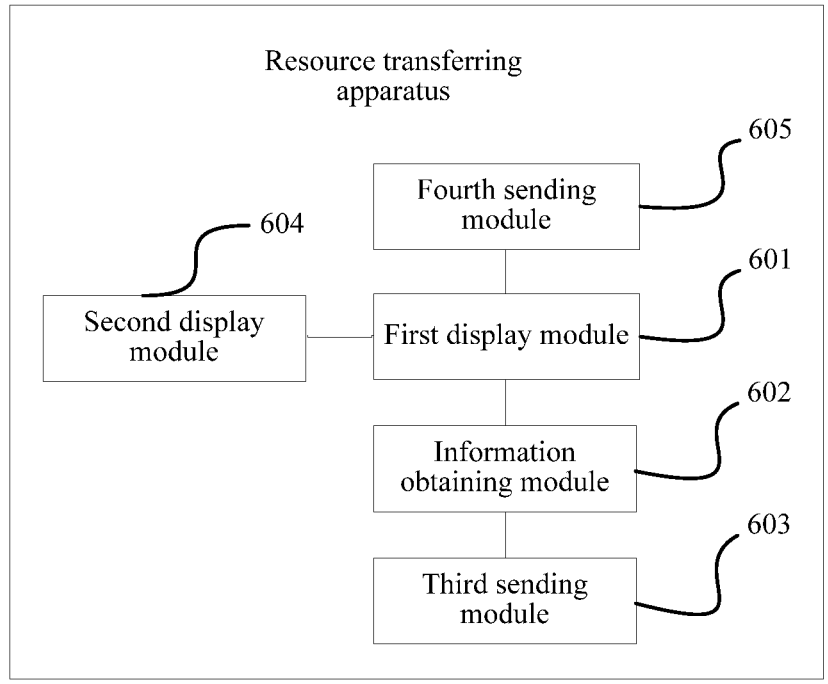
FIG. 6C is a schematic structural diagram of a resource transferring apparatus according to an embodiment of the present disclosure.

Optionally, referring to FIG. 6C, the apparatus further includes:

a fourth sending module 605, configured to send, when a resource transferring instruction is received, the resource transferring request for the specified account to the server if a user (e.g., the account member corresponding to the terminal) has a right for initiating the resource transferring request.

Figure 6D:
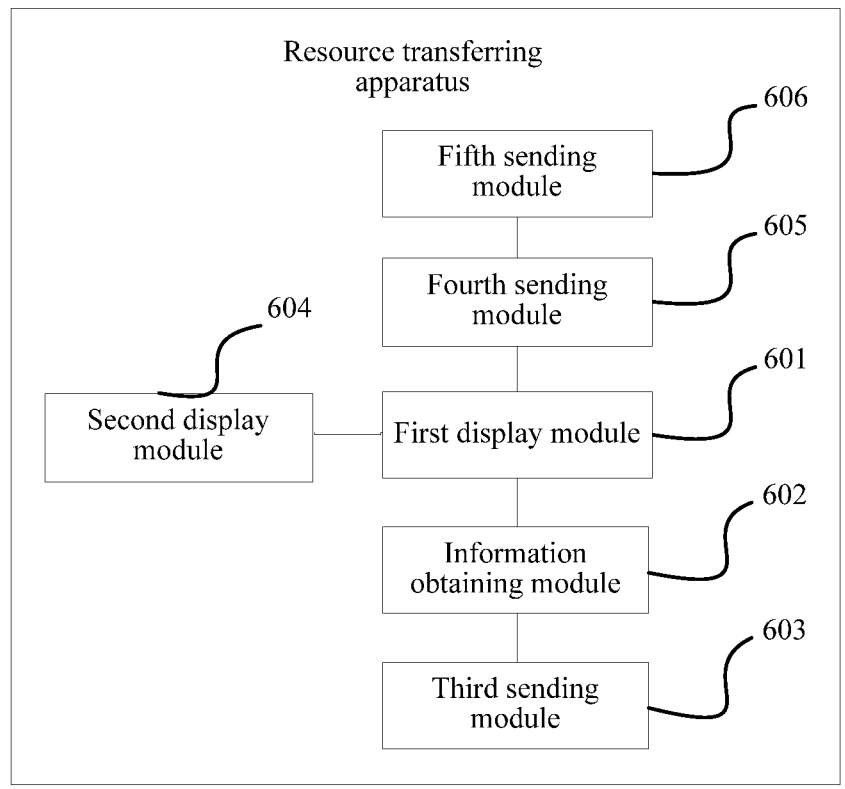
FIG. 6D is a schematic structural diagram of a resource transferring apparatus according to an embodiment of the present disclosure.

Optionally, referring to FIG. 6D, the apparatus further includes:

a fifth sending module 606, configured to send, initiate resource collecting for the specified account, and send a resource collection instruction for the specified account to the server if the client/account member corresponding to the terminal has a right for initiating the resource transferring request, to enable the server to notify the at least two account members to transfer a resource to the specified account.

Figure 6E:
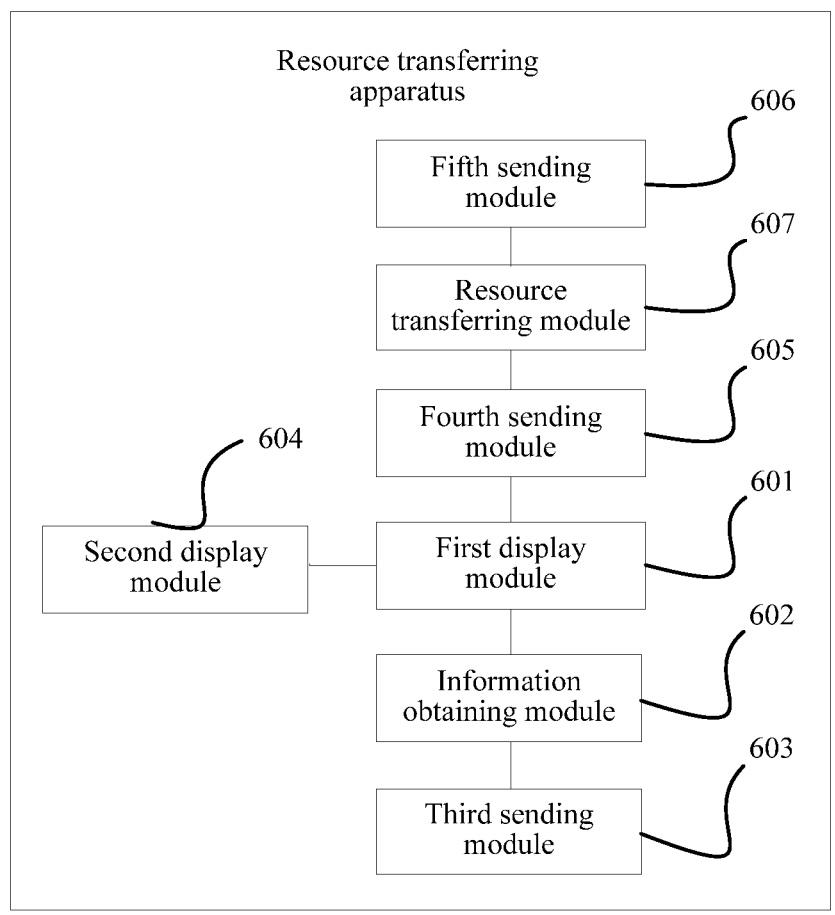
FIG. 6E is a schematic structural diagram of a resource transferring apparatus according to an embodiment of the present disclosure.

Optionally, referring to FIG. 6E, the apparatus further includes:

a resource transferring module 607, configured to transfer the resource to the specified account when receiving a resource collection request sent by the server.

Optionally, the at least two account members have a right for viewing the specified account.

Figure 7:
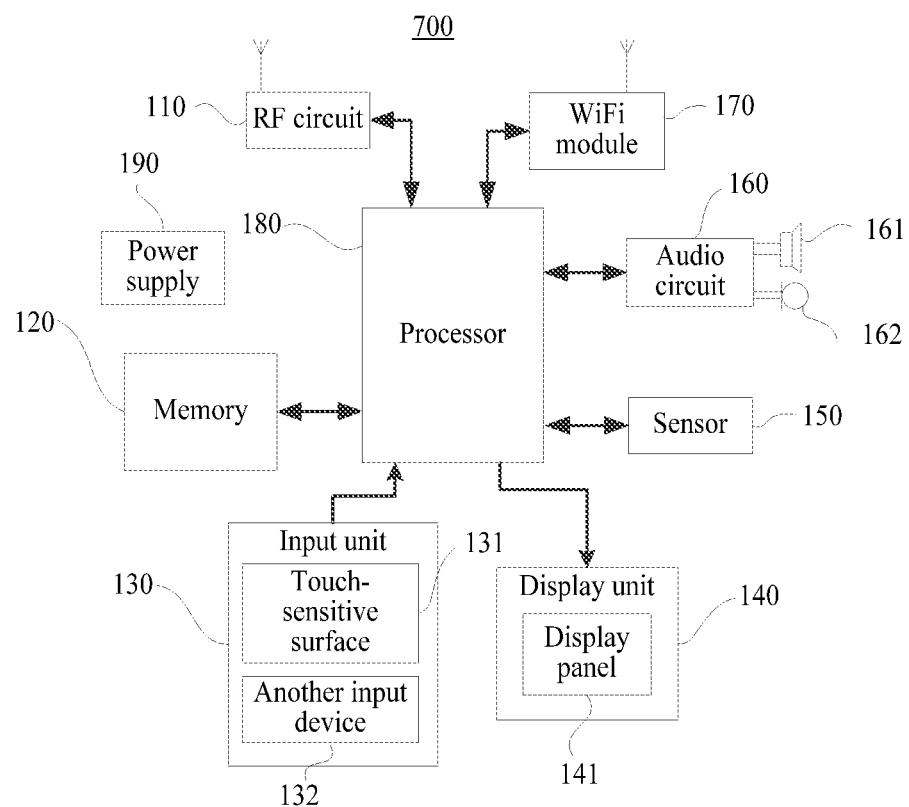
FIG. 7 is a schematic structural diagram of a terminal according to an embodiment of the present disclosure.

An embodiment of the present disclosure provides a terminal. The terminal may be configured to perform the resource transferring methods in the foregoing embodiments. Referring to FIG. 7, the terminal 700 includes:

The terminal 700 may include components such as a radio frequency (RF) circuit 110, a memory 120 including one or more computer-readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 7 does not constitute a limitation to the terminal, and the terminal may include more components or fewer components than those shown in the figure, or some components may be combined, or a different component deployment may be used. Where:

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, short messaging service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 700, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 700. The graphical user interfaces may be composed of graphics, text, icons, videos, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 141 transfers the touch operation to the processor 180, to determine the type of the touch event. Then, the processor 180 provides a corresponding visual output on the display panel 1241 according to the type of the touch event. Although, in FIG. 7, the touch-sensitive surface 131 and the display panel 141 are used as two separate parts to implement input and output functions, in some embodiments, the touch-sensitive surface 131 and the display panel 141 may be integrated to implement the input and output functions.

The terminal 700 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 700 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 700, are not described in detail herein.

The audio circuit 160, a speaker 161, and a microphone 162 may provide audio interfaces between the user and the terminal 700. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 700.

WiFi is a short distance wireless transmission technology. The terminal 700 may help, by using the WiFi module 170, the user to receive and send emails, browse a web page, access streaming media, and so on, which provides wireless broadband Internet access for the user. Although FIG. 7 shows the WiFi circuit 170, it may be understood that the wireless communications unit is not a necessary component of the terminal 700, and when required, the wireless communications unit may be omitted as long as the scope of the essence of the present disclosure is not changed.

The processor 180 is a control center of the terminal 700, which is connected to various parts of the entire mobile phone by using various interfaces and lines, and by running or executing a software program and/or module stored in the memory 120 and calling data stored in the memory 120, to perform various functions of the terminal 700 and process data, so as to perform overall monitoring on the mobile phone. Optionally, the processor 180 may include one or more processor cores. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 700 may further include a camera, a Bluetooth module, and the like, which are not described herein. Specifically, in some embodiments, the display unit of the terminal is a touch-screen display. The terminal includes one or more processors, a memory, and one or more programs, the one or more programs being stored in the memory, the program may include one or more modules, one module being corresponding to one group of instructions, and the one or more processors being configured to execute instructions to perform the method steps of operations at a terminal side in some embodiments provided by this application.

An embodiment of the present disclosure further provides a computer-readable storage medium. The computer-readable storage medium stores a computer program, and the computer program implements the steps of the resource transferring method of a terminal side in some embodiments provided by this application when being executed by the processor.

Figure 8:
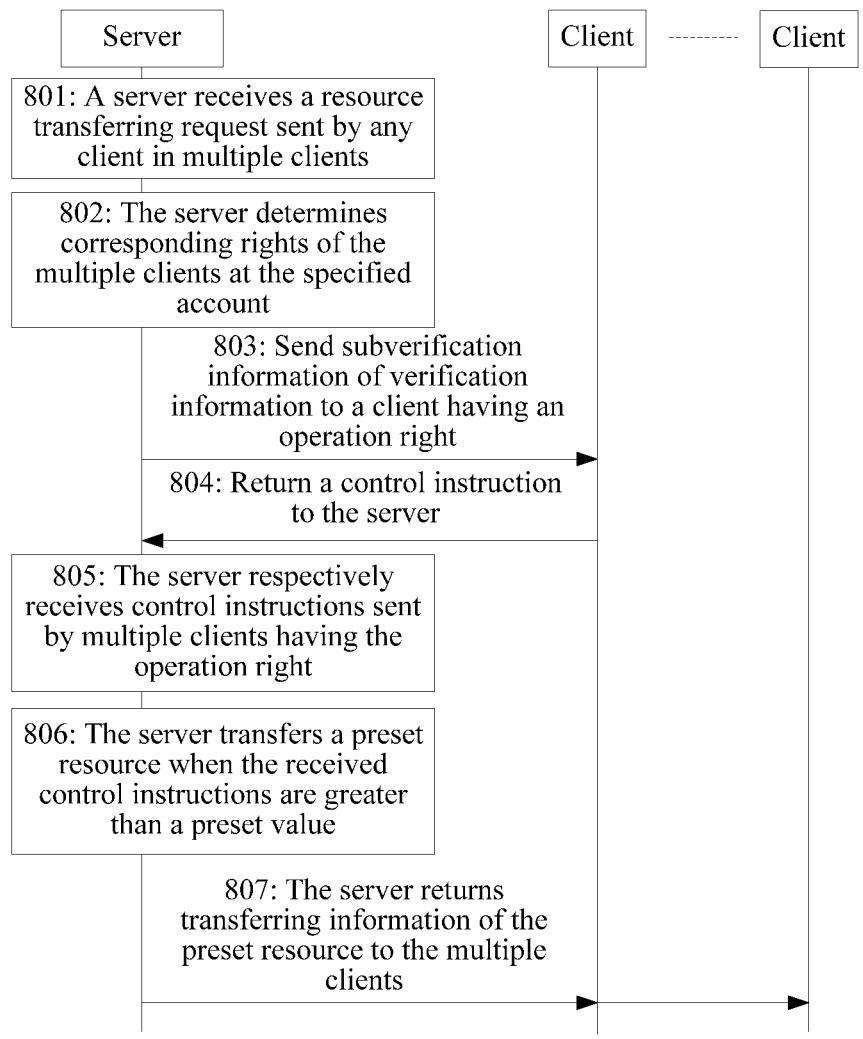
FIG. 8 is a flowchart of a resource transferring method for an account according to an embodiment of the present disclosure.

FIG. 8 is a flowchart of a resource transferring method for an account according to an embodiment of the present disclosure. Referring to FIG. 8, the method includes:

801: A server receives a resource transferring request corresponding to a shared specified account sent by any client in multiple clients. The specified account is registered at the server as being associated with the multiple clients, and stores a preset resource.

A relationship between the specified account and the multiple clients is a relationship between the specified account and a user account logging in by each of the clients. The multiple clients may form a group. In this case, the specified account is an account bound by a group. Certainly, the specified account by alternatively be an account associated with multiple account members. Certainly, a user account logging in any client of the multiple clients may be referred to as the account member of the specified account. For the foregoing association relationship, the specified account may be displayed in a group option list of the group of each of the clients. Alternatively, the specified account may be displayed on a virtual account page of each of the clients and may be displayed together with a virtual account of the client. For example, for a social application, the foregoing group may be a group or a temporary group in the social application.

The resource transferring request may be initiated by any client, or may be initiated by a client having an operation right of the specified account. For the server, if the resource transferring operation has a right limitation, right verification may be first performed on a client initiating the request. If having the operation right, the client responds to the resource transferring request and executes the following steps.

802: The server determines corresponding rights of the multiple clients at the specified account, the rights including an operation right and an ordinary right, the operation right being different from the ordinary right, and the operation right being capable of controlling a transfer of the preset resource.

The multiple clients may have different rights. When the multiple clients register the specified account, the rights of the multiple clients may be determined. For example, the operation right may be set for a client creating the specified account, and the ordinary right may be set for a subsequently joining client. In addition, the client creating the specified account may change a right of another client, for example, from the ordinary right to the operation right. Clients having the ordinary right and the operation right may have a right for viewing the specified account, for example, viewing transaction details and an account balance.

803: The server sends operation information to the multiple clients respectively. The server may obtain verification information of the resource transferring request, and obtain sub-verification information by subdividing the verification information of the resource transferring request. The sub-verification information may be included in the operation information for a client having the operation right.

A specific process of subdividing the sub-verification information may be as described in step 102, which is not further described herein. To verify the resource transferring request, a client having the operation right may be selected from the multiple clients to send the sub-verification information. Such type of client having the operation right may have a right for determining whether to transfer a resource, therefore, these clients feed back information based on the sub-verification information to determine whether to transfer a resource.

Further, the server may also send notification information of the resource transferring request to a client having the ordinary right, thereby enabling the client having the ordinary right to learn that someone initiates the resource transferring. In addition, the notification information may also carry specific information of the resource transferring, for example, a transferred amount of money, and an initiator of the resource transferring, so as to achieve a notification objective and make the process of the resource transferring more transparent.

In the foregoing step 803, the server may send different operation information to clients having different rights according to different rights. In processes such as resource viewing and resource collection, the server may also selectively send different operation information to the clients having different rights based on different rights, so as to determine whether to perform an operation or perform a notification related to the operation.

804: A client having the operation right returns a control instruction to the server after receiving the sub-verification information.

In an implementation, when receiving the sub-verification information, the client having the operation right may display the sub-verification information, provide a user input box to prompt the user to input the sub-verification information, and return the information input by the user to the server. The input of information of the user may represent that the user agrees the current resource transferring, therefore, the information input by the user may be directly added to the control instruction to return the control instruction to the server. Certainly, in another implementation, the sub-verification information may alternatively not be displayed, and provide an option of whether to transfer a resource for the user. When selecting to transfer the resource, the user triggers a corresponding option, so as to trigger the control instruction used for determining transferring the resource. In this case, the client may add the received sub-verification information to the control instruction to return the control instruction to the server, thereby enabling the server to determine whether to transfer the resource based on the control instruction.

805: The server respectively receives control instructions sent by multiple clients having the operation right.

For the control instructions, after the server receives the control instructions, if each of the control instructions is an instruction for determining to transfer the resource, it may be determined whether to transfer the resource based on the number of the base instruction.

806: The server transfers the preset resource when a number of the received control instructions are greater than a preset value.

Step 806 is similar to the step of restoring the verification information in step 104. If the number of the received control instructions are greater than the preset value, it indicates that the received sub-verification information can be restored to the verification information. Therefore, it is determined that the resource transferring request is an operation approved by the multiple clients of the specified account. In this way, the process of transferring the preset resource may be executed based on the resource transferring request. Certainly, the preset resource is a to-be-transferred resource at this time, and may be some resources or all resources in the specified account. This is not limited by this embodiment of the present disclosure.

807: The server returns transferring information of the preset resource to the multiple clients.

When the resource transferring is completed, to enable each of the clients can learn of a state of the resource transferring, the transferring information may be sent to the multiple clients. The transferring information may be used for indicating a complete condition of the current resource transferring, a complete time, a transferred amount of money, and the like. Information specifically included in the transferring information is not limited by this embodiment of the present disclosure.

Certainly, the client having the operation right may also have a right for collecting a resource. For example, when receiving a resource collection instruction for the specified account of the client having the operation right, the server sends a resource collection request to the multiple clients, the resource collection request being used for instructing the multiple clients to transfer the resource to the specified account.

When setting the operation right, it clearly indicates that the operation right includes a right for transferring a resource out of the specified account (e.g., transferring the resource out can be accomplished by cooperation of at least two account members having the operation right), a right for viewing the specified account, and a right for transferring a resource to the specified account. In an actual scenario, another right may be added based on a using requirement. This is not limited by this embodiment of the present disclosure. In the foregoing embodiment, only a resource transferring method based on a group account is simply described by using interaction between the server and the client as an example, thereby enabling multiple persons to share an account, and to securely and orderly transfer a resource based on the account. This greatly improves resource transferring efficiency.

Figure 9:
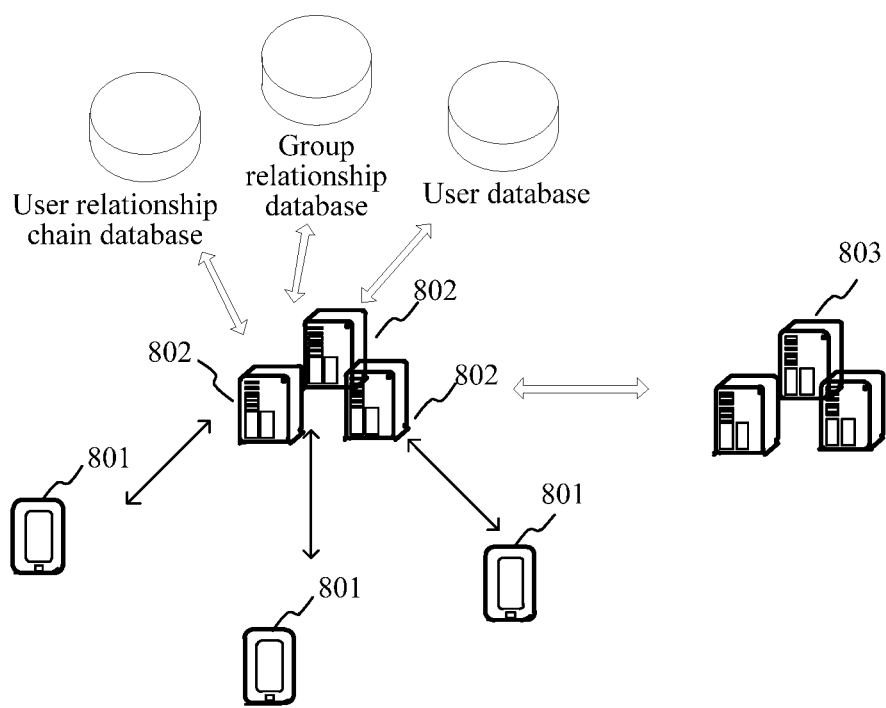
FIG. 9 is a schematic structural diagram of an implementation environment according to an embodiment of the present disclosure.

For ease of understanding an application environment of the entire disclosure, the following describes the application environment of the entire disclosure with reference to the foregoing possible hardware structures. Referring to FIG. 9, the application environment includes multiple terminals 901 and a server 902 configured to provide a service to the multiple terminals. The multiple terminals 901 are connected to the server 902 by using a wireless or a cable network. The multiple terminals 901 may be electronic devices that can access the server 902. The electronic device may be a computer, a smartphone, a tablet computer, or another electronic device. The server 902 may refer to a server group formed by one or more servers. The server 902 may provide services such as information publishing, resource transferring, and data storage for the terminal according to an operation performed by a user by using the terminal. For the server 902, the server 902 may also have at least one database configured to store a user relationship chain, a group relationship, user-related data, and the like. Certainly, to implement operations such as recharging from a financial institution to an account, the server 902 may also communicate with a server 903 of the financial institution, so as to perform specific transaction processing such as paying and recharging.

Specified members having decision-making power are set in a specified account. These specified members initiate a resource transferring request by using the specified account. A server subdivides verification information of the resource transferring request into different sub-verification information to distribute to each of the specified members. Current resource transferring is completed according to feedback of the specified members. While security of the specified account is ensured, flexibility of resource transferring may be improved and actual efficiency is high.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A resource transferring method, applied to a server, comprising:

receiving a resource transferring request corresponding to a specified account, wherein the specified account is registered at the server as being associated with multiple clients, the specified account stores a preset resource, and the multiple clients include an ordinary client having an ordinary right and at least two specified clients each having an operation right, and wherein the operation right includes a right of resource-transfer into the specified account, a right of viewing the specified account, and a right of resource-transfer out of the specified account, and wherein the ordinary right includes the right of resource-transfer into the specified account and the right of viewing the specified account, and excludes the right of resource-transfer out of the specified account;

generating verification information and notification information of the resource transferring request;

sending the notification information to the ordinary client having the ordinary right;

dividing the verification information into at least two sub-verification information prompts and sending the at least two sub-verification information prompts respectively to the at least two specified clients provided with the operation right, wherein the at least two sub-verification information prompts are sent by the server respectively to the at least two specified clients via a social application, and wherein the at least two specified clients are part of a group or a temporary group in the social application;

respectively receiving control instructions sent by the at least two specified clients having the operation right in response to receipt of the at least two sub-verification information prompts by the at least two specified clients, wherein the at least two specified clients include n specified clients, the at least two sub-verification information prompts include t sub-verification information prompts, and t is smaller than n, and wherein the control instructions include t control instructions;

determining t control instructions are received back from t out of n specified clients;

comparing a combination of the t control instructions with the verification information to obtain a comparison result;

transferring the preset resource according to the comparison result and upon determining a number of the control instructions as received is greater than a preset value; and returning transferring information of the preset resource to the multiple clients, such that the multiple clients are dynamically informed of the specified account.

2. The method according to claim 1, wherein the method further comprises:

determining that the control instructions match the verification information; and executing a resource transferring process based on the specified account upon determining that the control instructions match the verification information.

3. The method according to claim 1, wherein the method further comprises:
   receiving a resource collection instruction for the specified account from one or more of the at least two specified clients;
   respectively sending a resource collection request to two or more of the multiple clients upon receipt at the server of the resource collection instruction, the resource collection request being used for instructing the two or more of the multiple clients to transfer a resource to the specified account.

4. The method according to claim 3, wherein the method further comprises:
   obtaining a resource value corresponding to each of the two or more of the multiple clients according to a preset collection percentage and a total value of the resource specified by the resource collection instruction; and
   including the resource value to the resource collection request.

5. The method according to claim 1, wherein the at least two sub-verification information prompts are each displayed in a form of a verification picture or a verification code respectively at the at least two specified clients.

6. The method according to claim 5, wherein the at least two sub-verification information prompts are each displayed in the form of the verification code, and the method further comprises:
   configuring the verification code to be scannable; and
   displaying the specific account and a bank account upon the verification code being scanned, wherein the preset source is transferred between the specific account and the bank account.

7. The method according to claim 1, wherein the first sub-verification information prompt differs than the second sub-verification information.

8. The method according to claim 1, wherein sending the notification information to the ordinary client includes:
   notifying the ordinary client that the resource transferring request from one or more of the at least two specified clients has been received at the server.

9. The method according to claim 1, further comprising:
   determining whether an account number initiating the resource transferring request is the ordinary client or one of the at least two specified clients;
   in response to determining the account number initiating the resource transferring request is the ordinary client, denying the resource transferring request; and
   in response to determining the account number initiating the resource transferring request is the one of the at least two specified clients, allowing the resource transferring request to proceed with generating the verification information and the notification information of the resource transferring request.

10. The method according to claim 1, wherein the resource transferring request includes a payment request, the verification information includes a payment password, and the payment password is divided to at least two sub-payment passwords and the at least two sub-verification information prompts.

11. A resource transferring method, applied to a user terminal, comprising:
    receiving operation information of a resource transferring request corresponding to a specified account from a server, wherein the specified account is registered at the server as being associated with multiple clients, wherein the multiple clients include an ordinary client having an ordinary right and at least two specified clients each having an operation right, wherein the operation right includes a right of resource-transfer into the specified account, a right of viewing the specified account, and a right of resource-transfer out of the specified account, wherein the ordinary right includes the right of resource-transfer into the specified account and the right of viewing the specified account, and excludes the right of resource-transfer out of the specified account, wherein the user terminal is one of the at least two specified clients, and wherein the operation information includes a first sub-verification prompt directed to the user terminal, the first sub-verification prompt and a second sub-verification prompt being obtained by dividing verification information at the server, the second sub-verification prompt being directed to a second user terminal, the second user terminal being another of the at least two specified clients, wherein the at least two sub-verification information prompts are sent by the server respectively to the at least two specified clients via a social application, and wherein the at least two specified clients are part of a group or a temporary group in the social application, wherein the at least two specified clients include n specified clients, the first and the second sub-verification prompts are part of t sub-verification information prompts, and t is smaller than n, and wherein the operation information includes a control instruction, and the control instruction is part of t control instructions;
    displaying a resource transferring confirmation interface of the specified account;
    prompting, at the resource transferring confirmation interface, an input box responsive to the first sub-verification prompt included in the operation information received from the server;
    obtaining, at the resource transferring confirmation interface, verification feedback information input collected through the input box; and
    in response to determining by the server t control instructions are received back from t out of n specified clients and in response to receiving a comparison result obtained from comparing by the server a combination of the t control instructions with the verification information, sending the verification feedback information to the server, to enable the server to transfer a resource out of the specified account according to the verification feedback information, such that the multiple clients are dynamically informed of the specified account.

12. The method according to claim 11, wherein the method further comprises:
    receiving a resource transferring instruction corresponding to the specified account; and
    sending, after receipt of the resource transferring instruction, the resource transferring request for the specified account to the server.

13. The method according to claim 11, wherein the method further comprises:
    initiating a resource collection into the specified account; and
    sending a resource collection instruction for the specified account to the server to enable the server to notify the multiple clients on the resource collection.

14. The method according to claim 11, wherein the method further comprises:

receiving a resource collection request corresponding to the specified account from the server, the resource collection request being used for instructing two or more of the multiple clients to transfer a resource to the specified account.

15. The method according to claim 14, wherein the method further comprises:
   transferring a resource to the specified account after the resource collection request sent by the server is received.

16. A terminal, comprising one or more processors, and a memory, wherein the one or more processors are configured to perform:
   receiving operation information of a resource transferring request corresponding to a specified account from a server, wherein the specified account is registered at the server as being associated with multiple clients, wherein the multiple clients include an ordinary client having an ordinary right and at least two specified clients each having an operation right, wherein the operation right includes a right of resource-transfer into the specified account, a right of viewing the specified account, and a right of resource-transfer out of the specified account, wherein the ordinary right includes the right of resource-transfer into the specified account and the right of viewing the specified account, and excludes the right of resource-transfer out of the specified account, wherein the user terminal is one of the at least two specified clients, and wherein the operation information includes a first sub-verification prompt directed to the user terminal, the first sub-verification prompt and a second sub-verification prompt being obtained by dividing verification information at the server, the second sub-verification prompt being directed to a second user terminal, the second user terminal being another of the at least two specified clients, wherein the at least two sub-verification information prompts are sent by the server respectively to the at least two specified clients via a social application, and wherein the at least two specified clients are part of a group or a temporary group in the social application, wherein the at least two specified clients include n specified clients, the first and the second sub-verification prompts are part of t sub-verification information prompts, and t is smaller than n, and wherein the operation information includes a control instruction, and the control instruction is part of t control instructions;
   displaying a resource transferring confirmation interface of the specified account;
   prompting, at the resource transferring confirmation interface, an input box responsive to the first sub-verification prompt included in the operation information received from the server;
   obtaining, at the resource transferring confirmation interface, verification feedback information input collected through the input box; and
   in response to determining by the server t control instructions are received back from t out of n specified clients and in response to receiving a comparison result obtained from comparing by the server a combination of the t control instructions with the verification information, sending the verification feedback information to the server, to enable the server to transfer a resource out of the specified account according to the verification feedback information, such that the multiple clients are dynamically informed of the specified account.

17. The terminal according to claim 16, wherein the one or more processors are further configured to perform:
   receiving a resource transferring instruction corresponding to the specified account; and
   sending, after receipt of the resource transferring instruction, the resource transferring request for the specified account to the server.

18. The terminal according to claim 16, wherein the one or more processors are further configured to perform:
   initiating a resource collection into the specified account; and
   sending a resource collection instruction for the specified account to the server to enable the server to notify the multiple clients on the resource collection.

19. The terminal according to claim 16, wherein the one or more processors are further configured to perform:
   transferring a resource to the specified account after a resource collection request sent by the server is received.

\* \* \* \* \*